(No Model.)
J. F. PALMER.
PNEUMATIC TIRE.
No. 476,679. Patented June 7, 1892.
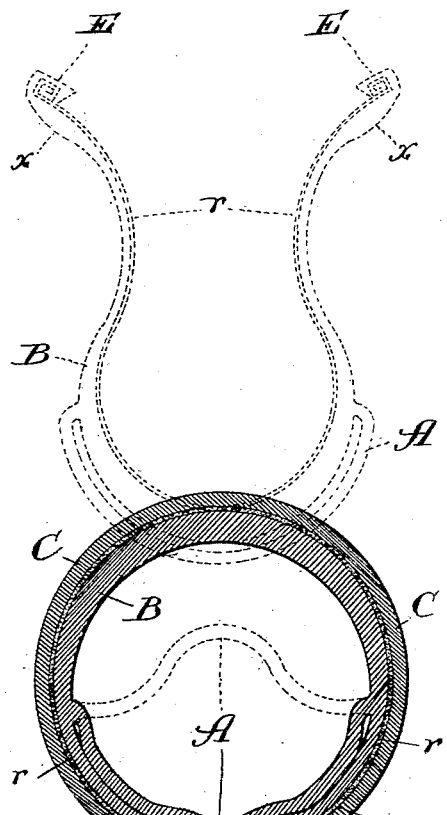

UNITED STATES PATENT OFFICE.

JOHN F. PALMER, OF RIVERSIDE, ILLINOIS.

PNEUMATIC TIRE.

SPECIFICATION forming part of Letters Patent No. 476,679, dated June 7, 1892.

Application filed February 20, 1892. Serial No. 422,202. (No model.)

*To all whom it may concern:*

Be it known that I, JOHN F. PALMER, a citizen of the United States, residing at Riverside, in the county of Cook and State of Illinois, have invented a new and useful Improvement in Pneumatic Tires, of which the following is a specification.

My invention relates to an improved method of forming a pneumatic tire such as is used on bicycles, and it also relates to improved fastening means for securing a pneumatic tire in place on the rim or felly of the wheel.

The first part of my invention relates particularly to an improved method of forming a construction of pneumatic tire involving an inner inflatable air-tube of rubber or the like and an outer retaining-envelope, usually of the same material, provided with a backing of inelastic material, such as canvas, whereby the inner inflatable tube and the retaining-envelope shall be integral. It also relates to that construction having the parts molded on one curve, whereby turning them on the reverse curve to form the tire will compress and densify the rubber portion of the envelope, thus to render it self-sealing in case of being punctured.

My object in both the aforesaid connections is to simplify, economize in, and improve the construction.

The object of the second part of my invention is to provide a pneumatic tire of the character described, with means for fastening it in place on the rim of the wheel through the medium of the retaining-envelope, which means shall be peculiarly effective and susceptible of convenient manipulation for fastening.

I show both features of my improvement as used conjointly in the same tire in the accompanying drawings, in which—

Figure 1 is a cross-sectional view in the nature of a diagram, showing by dotted lines the integral inner tube and retaining-envelope portions molded to describe a curve in one direction and prior to their curve being reversed to form the tire, as shown by the full-line representation, and which is applied to a hollow slotted wheel-felly by my improved fastening means. Fig. 2 is a broken cross-sectional view, diagrammatic in its nature, of the hollow slotted felly to which the tire-fastening means are undergoing application. Fig. 3 is a view like that presented in Fig. 2, but showing the tire-fastening means completely adjusted in place.

The air-tube proper is formed of a rubber web A, molded along its edges on a rubber strip B sufficiently wide to produce, when formed into a tube, a tire of desired diameter and which should be about double the width of the web A, the latter being concentric therewith. The outer surface of the strip B is backed with inelastic material, preferably canvas $r$, which may be secured to it by vulcanization.

The foregoing describes the aforesaid first-named portion of my invention in its broadest sense as involving the essential construction preliminary to forming thereof an inner inflatable tube afforded by the web A and opposing portion of the rubber strip B, and a retaining-envelope afforded by the whole of the canvas-backed strip B, turned about the web to envelop it and have its edges fastened together in any suitable manner—by lacing, for example. A tube so constructed will in a measure, even if the rubber B be of uniform thickness throughout, be self-sealing, though the rubber B be a straight strip bent into tubular form and joined together at its ends into the shape of a tire, since the mere bending of the rubber will compress and densify it somewhat and enable slight punctures to close themselves by the expansion into them of the surrounding compressed rubber. When the tube has been so formed, the web A will occupy the relative position indicated by dotted lines inside the full-line representation in Fig. 1, and by then forcing air under pressure into the space confined by the web A, which then is in the nature of a diaphragm, the web will be stretched into the shape of a semi-cylinder and form the base or inner half of the air-tube proper, as it is shown by the full line in Fig. 1.

It should here be stated that a pneumatic tire when formed with the details of construction as described, or in accordance with the preferred construction hereinafter described, may have the web A and canvas-covered strip B originally either in a straight length, as stated, adapted to be bent into tubular form, or in an endless or annular length for which it may be so bent.

It is preferred to mold the web A and canvas-covered strip B in a concentric curve, as shown by the dotted representation in Fig. 1, and to make the rubber B at least double the thickness of the web A along its longitudinal central portion, whence it tapers toward both edges, preferably to about the same thickness as the web. By this means, when the parts A and B are turned to describe the opposite curve, the rubber of the envelope B will (particularly if thickened in the manner described where, as will be seen, it eventually forms the tread) be materially compressed inside the canvas or other inelastic fabric r, and thus be self-sealing, in the sense hereinbefore suggested, to a high degree, sufficient in fact to fill punctures of considerable proportions.

As the outermost covering of the tire should be rubber on the outer surface thereof, I inclose the tube formed with the web A and canvas-covered rubber B in a covering of rubber C, which may, but not necessarily, be lined with an inelastic fabric q, such as canvas, and fasten the covering C in place in any suitable manner, but preferably by the fastening means hereinafter described.

The fastening means which I prefer to employ with this tire comprise beads along the edges of the canvas-covered retaining-envelope B, adapted to be inserted and confined in a slot in the felly or rim of the wheel. As shown, the beads E are in the form of wedges formed by folding the rubber and canvas strip inward along its edges and vulcanizing them to harden and consolidate them, and they are especially adapted to co-operate with a slotted felly D of the hollow construction illustrated, though they are also capable of similar use with a circumferentially-slotted felly forming a mere rim. In either case the fastening operation also produces the formation of the cylindrical tire, since first one bead is inserted into the slot p of the felly D and then the other, the insertion being attended by the reversal of the curve, in which the dotted representation in Fig. 1 presents the parts to that shown by the full lines to be described by them.

It is found desirable to thicken the rubber B toward its opposite edges, as indicated at x, since thereby they the more compactly fill the slot p. When the edge portions are so thickened, however, they render it necessary to proceed, as indicated in Fig. 2, to insert them by introducing the bead E, first inserted into the slot far enough to bring the thinner portion of the retaining-envelope B to the edge of the slot in order that the other bead E may be slipped past it into the slot. Then the tire is righted on the felly, thereby bringing both beads coincident against the under sides of the edge portions of the slot, which stop them against withdrawal. The cover C is then applied and fastened in any suitable manner, as by cementing it, or, and preferably, by clamping it along its edges between the felly D and retaining-envelope B. To fill the air-tube, a pointed nozzle may be inserted into it through the thicker tread portion at any desired point, thereby puncturing it, and when the tube has been adequately filled the nozzle may be withdrawn, the puncture it produced being immediately closed or sealed by the expansion into it of the compressed rubber. The resultant inflation of the rubber web A, whereby it is pressed against the fastening-edges of the retaining-envelope B, obviously tends the more securely to retain the beads E against withdrawal from the slot p, and, furthermore, effects firm clamping of the edges of the outer covering C.

What I claim as new, and desire to secure by Letters Patent, is—

1. The method of integrally forming the inner air-tube and self-sealing canvas-covered retaining-envelope therefor of a pneumatic tire, which consists in molding a web A, of rubber, with a canvas-covered rubber strip B on a curve, and then reversing the curve and forming the integral air-tube and retaining-envelope into an endless tubular tire-shaped ring, substantially as described.

2. The method of integrally forming the inner air-tube and self-sealing canvas-covered retaining-envelope therefor of a pneumatic tire, which consists in molding on a curve a canvas-covered rubber strip with a thickening of the rubber toward its longitudinal center and with a web A, of rubber, along its thickened portion, and then reversing the curve and forming the integral air-tube and retaining-envelope into an endless tubular tire-shaped ring, substantially as described.

3. As a new article of manufacture, a pneumatic tire having its retaining-envelope formed of canvas-covered compressed rubber provided with a rubber web A, forming with the said envelope the inner air-tube, substantially as described.

4. As a new article of manufacture, a pneumatic tire having its retaining-envelope formed of canvas-covered rubber with the rubber compressed and thickened toward the longitudinal center of the tread portion of the tire and provided along the said thickened portion with a rubber web A, forming with the said envelope the inner air-tube, substantially as described.

5. In combination, the slotted hollow felly D and a pneumatic tire comprising a retaining-envelope formed of canvas-covered rubber with the rubber compressed and thickened toward the longitudinal center of the tread portion of the tire and provided along the said thickened portion with a web A, forming with the said envelope the air-tube, beads E along the edges of the retaining-envelope to enter the slot in the felly and fasten the tire in place, and an outer covering C, clamped along its edges between the said felly and retaining-envelope, substantially as described.

JOHN F. PALMER.

In presence of—
J. N. HANSON,
W. N. WILLIAMS.